United States Patent
Brands et al.

(10) Patent No.: US 8,417,711 B2
(45) Date of Patent: *Apr. 9, 2013

(54) DATA ANALYSIS BASED ON DATA LINKING ELEMENTS

(75) Inventors: Michael Rik Frans Brands, Antwerp (BE); Dirk Medard Helena Van Hyfte, Hamont (BE)

(73) Assignee: I. Know NV., Diepenbeek (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/046,110

(22) Filed: Mar. 11, 2011

(65) Prior Publication Data

US 2011/0161385 A1    Jun. 30, 2011

Related U.S. Application Data

(63) Continuation of application No. 11/855,103, filed on Sep. 13, 2007, now Pat. No. 7,912,841.

(60) Provisional application No. 60/844,450, filed on Sep. 13, 2006.

(51) Int. Cl.
*G06F 7/00* (2006.01)
*G06F 17/30* (2006.01)

(52) U.S. Cl. ......... 707/748; 707/758; 707/792; 707/913

(58) Field of Classification Search .................. 707/705, 707/736, 748, 755, 792, 913
See application file for complete search history.

(56) References Cited

U.S. PATENT DOCUMENTS

| | | | |
|---|---|---|---|
| 6,038,561 A | 3/2000 | Snyder et al. | |
| 6,076,088 A | 6/2000 | Paik et al. | |
| 6,263,335 B1 | 7/2001 | Paik et al. | |
| 6,493,706 B1 * | 12/2002 | Mead et al. | 1/1 |
| 6,564,213 B1 * | 5/2003 | Ortega et al. | 1/1 |
| 6,629,097 B1 | 9/2003 | Keith | |
| 7,428,517 B2 * | 9/2008 | Brands et al. | 706/45 |
| 7,444,356 B2 | 10/2008 | Calistri-Yeh et al. | |
| 7,506,024 B2 * | 3/2009 | Benitez et al. | 709/203 |
| 7,509,581 B1 * | 3/2009 | Song et al. | 715/721 |
| 8,108,204 B2 * | 1/2012 | Gabrilovich et al. | 704/9 |
| 2003/0004915 A1 | 1/2003 | Lin et al. | |
| 2007/0143235 A1 | 6/2007 | Kummamuru et al. | |

* cited by examiner

*Primary Examiner* — Robert Beausoliel, Jr.
*Assistant Examiner* — Susan F Rayyan
(74) *Attorney, Agent, or Firm* — Wolf, Greenfield & Sacks, P.C.

(57) ABSTRACT

A computer controlled method for automatically segmenting an ensemble of data. The method starts by acquiring an ensemble of data and data is segmented by identifying a first subset of sequences of Linking Data Elements based on a repository of Linking Data Elements. A second subset of sequences of Information Carrying Data Elements is identified, wherein the sequences are linked by the Linking Data Elements. The subsets are provided in a structured format.

14 Claims, 17 Drawing Sheets

Ensemble of Data

| a | b | c | d | a | e | f | C1 |
| d | g | h | e | f | i | j | C2 |
| j | b | c | k | d | i | l | C3 |
| a | f | g | h | l | m | k | C4 |

FIG. 1

```
appears to have;Appear-SIntentionallyCausedProcess
appears to improve;Appear-SIntentionallyCausedProcess
appears to increase;Appear-SIntentionallyCausedProcess
appears to markedly;Appear-SIntentionallyCausedProcess
appears to negatively;Appear-SIntentionallyCausedProcess
appears to occur;Appear-SIntentionallyCausedProcess
appears to partially;Appear-SIntentionallyCausedProcess
appears to positively;Appear-SIntentionallyCausedProcess
appears to predict;Appear-SIntentionallyCausedProcess_SPredict
appears to protect;Appear-SIntentionallyCausedProcess
appears to reduce;Appear-SIntentionallyCausedProcess
appears to significantly;Appear-SIntentionallyCausedProcess
appears to subsequently;Appear-SIntentionallyCausedProcess
appears to transiently;Appear-SIntentionallyCausedProcess
appears via selective;Appear-SIntentionallyCausedProcess
appended on a;SSpatialRelation
```

FIG. 5

| | |
|---|---:|
| it | 111337 |
| share | 68995 |
| year | 33846 |
| the | 31474 |
| he | 28873 |
| sales | 28361 |
| cents | 25924 |
| company | 25589 |
| revenue | 23318 |
| earnings | 21837 |
| they | 21381 |
| shares | 20929 |
| all rights reserv | 20753 |
| analysts | 19712 |
| us | 19629 |
| not | 19579 |
| we | 18526 |
| the company | 18319 |
| profit | 18117 |
| broadcast | 17894 |
| this material | 17734 |
| well | 16117 |
| investors | 15593 |
| end | 14613 |
| market | 14364 |
| 2006 | 13257 |
| pct | 13200 |
| buy | 13103 |
| growth | 12121 |
| 2005 | 11777 |
| stock | 11380 |
| out | 10599 |
| quarter | 10443 |
| tuesday | 10230 |
| line | 10090 |
| higher | 9744 |
| one | 9707 |
| trading | 9237 |
| china | 9123 |
| thomson first | 8917 |
| lower | 8831 |
| deal | 8703 |
| monday | 8671 |
| first quarter | 8604 |
| wednesday | 8435 |

FIG. 9

| SubSequence | Associated Sequences | Associated ICDE keys | Associated LDE keys |
|---|---|---|---|
| a | a;da;agf | 3;4;8 | |
| f | f,agf | 1;8 | |
| k | k;kd | 9;6 | |
| l | l;hlm | 7 | 4 |
| d | da;kd;dgh | 4;6;5 | |
| g | dgh;agf | 5;8 | |
| h | dgh;hlm | 5 | 4 |
| m | hlm | | 4 |
| bc | bc | | 1 |
| e | e | | 2 |
| i | i | | 3 |
| j | j | 2 | |

| Index of sequences of ICDEs | | |
|---|---|---|
| Key | Value | Occurrences |
| 1 | f | C1-5 ;C2-3 |
| 2 | j | C2-5 ;C3-1 |
| 3 | a | C1-1 |
| 4 | da | C1-3 |
| 5 | dgh | C2-1 |
| 6 | kd | C3-3 |
| 7 | l | C3-5 |
| 8 | agf | C4-1 |
| 9 | k | C4-3 |

| Index of sequences of LDEs | | |
|---|---|---|
| Key | Value | Occurrences |
| 1 | bc | C1-2 ; C3-2 |
| 2 | e | C1-4 ; C2-2 |
| 3 | i | C2-4 ; C3-4 |
| 4 | hlm | C4-2 |

FIG. 10

| | | | | |
|---|---|---|---|---|
| february | 4697 | FEBRUARY | H4Lvd | |
| division | 4663 | DIVISION | H4Lvd | Negativ |
| director | 4626 | DIRECTOR | H4Lvd | |
| debt | 4621 | DEBT | H4Lvd | |
| french | 4547 | FRENCH | H4Lvd | |
| composite | 4546 | COMPOSITE | H4Lvd | |
| operator | 4522 | OPERATOR | H4Lvd | |
| core | 4484 | CORE | H4Lvd | |
| spokesman | 4481 | SPOKESMAN | H4Lvd | |
| volume | 4479 | VOLUME | Lvd | |
| initial | 4414 | INITIAL | H4Lvd | |
| then | 4413 | THEN | H4Lvd | |
| local | 4402 | LOCAL | H4Lvd | |
| long-term | 4371 | LONG-TERM | Lvd | |
| solid | 4328 | SOLID | H4Lvd | |
| francisco | 4320 | FRANCISCO | H4Lvd | |
| germany | 4275 | GERMANY | H4Lvd | |
| officer | 4268 | OFFICER | H4Lvd | |
| become | 4236 | BECOME | H4Lvd | |
| america | 4230 | AMERICA | H4Lvd | |
| newspaper | 4135 | NEWSPAPER | H4Lvd | |
| best | 4123 | BEST | H4Lvd | Positiv |
| mobile | 4111 | MOBILE | H4Lvd | |
| food | 4096 | FOOD | H4Lvd | |
| reduce | 4095 | REDUCE | H4Lvd | |
| daily | 4091 | DAILY | H4Lvd | |
| competition | 4084 | COMPETITION | H4Lvd | Negativ |
| barrel | 4036 | BARREL | H4Lvd | |
| system | 4019 | SYSTEM | H4Lvd | |
| negative | 4017 | NEGATIVE | H4Lvd | Negativ |

FIG. 14

| |
|---|
| amsterdam afx ing groep nvs real estate division |
| an amnesty agreement the antitrust division |
| an unprofitable division |
| analysis division |
| analysts expectationsthe seattle-based commercial airpla |
| analyststhe express division |
| analyststhe fixed-line/broadband division |
| analytics lsa divisions |
| anglos base-metals division |
| animal health division |
| antena 3s uniprex division |
| anticipatedthe chevron division |
| antitrust division |
| antitrust division hurlock |
| antitrust divisionalastairreed@afxnewscomar/lam |
| antitrust divisionfour hynix semiconductor inc officials |
| any further improvementin the groups general merchanting |
| aol division |
| aol division saying it |
| aols digital services division |
| apns online division |
| apparent divisions |
| appliances divisions |
| application business division |
| april 2007leightons asia division chief executive david sava |
| aps broadcast division |
| arcelor mittal american flat products divisionmike rippey |

FIG. 15

|  | ICDE | LDE | ICDE |  |
|---|---|---|---|---|
| ETIOLOGY [severe electrocardiographic anomalies] subarachnoidal bleedings | subarachnoidal bleedings | can cause | severe electrocardiographic anomalies | subarachnoidal bleedings severe electrocardiographic anomalies |
| ETIOLOGY [allergic rhinitis] infection | infection | as a cause of | allergic rhinitis | infection allergic rhinitis |
| ETIOLOGY [dysphagia] achalasia | achalasia | as the cause of | dysphagia | achalasia dysphagia |
| ETIOLOGY [infertility] antisperm antibodies | antisperm antibodies | as a cause of | infertility | antisperm antibodies infertility |
| ETIOLOGY [clinical malaria] blood stage infection | blood stage infection | which causes | clinical malaria | blood stage infection clinical malaria |
| ETIOLOGY [hypertrophy] energy input | energy input | that causes | hypertrophy | energy input hypertrophy |
| ETIOLOGY [urolithiasis] djenkol bean | djenkol bean | as a cause of | urolithiasis | djenkol bean urolithiasis |
| ETIOLOGY [reduction] alkaline csf | alkaline csf | also caused | reduction | alkaline csf reduction |
| ETIOLOGY [depression] small doses | small doses | may cause | depression | small doses depression |
| ETIOLOGY [arterial spasm] aggregation | aggregation | may cause | arterial spasm | aggregation arterial spasm |
| ETIOLOGY [severe nerve compression pain] long peroneal muscle hernia | long peroneal muscle hernia | which caused | severe nerve compression pain | long peroneal muscle hernia severe nerve compression pain |
| ETIOLOGY [dissociation] pharmacological substances | pharmacological substances | may cause | dissociation | pharmacological substances dissociation |
| ETIOLOGY [vasodilatation] 2-2-pyridylethylamine | 2-2-pyridylethylamine | also caused | vasodilatation | 2-2-pyridylethylamine vasodilatation |
| ETIOLOGY [urinary retention] long-term phenothiazine therapy | long-term phenothiazine therapy | can cause | urinary retention | long-term phenothiazine therapy urinary retention |

FIG. 17

DATA ANALYSIS BASED ON DATA LINKING ELEMENTS

CROSS-REFERENCE TO RELATED APPLICATIONS

This application claims the benefit under 35 U.S.C. §120 of U.S. application Ser. No. 11/855,103, entitled "DATA ANALYSIS BASED ON DATA LINKING ELEMENTS" filed on Sep. 13, 2007, which is herein incorporated by reference in its entirety. application Ser. No. 11/855,103 claims priority under 35 U.S.C. §119(e) to U.S. Provisional Application Ser. No. 60/844,450, entitled "DATA ANALYSIS BASED ON DATA LINKING ELEMENTS" filed on Sep. 13, 2006, which is herein incorporated by reference in its entirety.

FIELD OF THE INVENTION

The present invention relates generally to the field of data analysis, data integration, knowledge management business intelligence, and artificial intelligence (i.e. knowledge-based systems, reasoning systems, context awareness systems, etc.) and, more specifically, to a system, method and computer program to organize, formalize, represent, record, use, retrieve, distribute, manage and integrate data and knowledge in order to support the knowledge life cycle within organizations.

BACKGROUND OF INVENTION

Today, it is recognized that knowledge is one of the most important assets of organizations. It is a challenge to be able to manage these knowledge assets. Advanced knowledge management requires thorough analyses and interpretation of all available data either of a technical or a non-technical nature pertaining to one or more application domains and of any type such as a linguistic data type, an image data type, a video data type, a sound data type, a control data type, a measurement data type, olfactive and tactile data types. Knowledge regarding processes, products, markets, technologies and the organization likewise have to be processed. This ultimately enables the organizations to make profit.

Most information technology (IT) employed to enable knowledge work appears to target data and information, as opposed to knowledge itself. Present IT systems used to support knowledge management are limited primarily to conventional database management systems (DBMS), data warehouses and data mining tools (DW/DM), intranet/extranet and groupware.

In these existing systems the underlying representation of the reality domain that is used as a starting and reference point for the supported knowledge related activity is based on predefined conceptual representations. This implies that all of these applications are more or less strictly related and restricted to specific knowledge domains and that dealing with the every day increasing list of new concepts within all knowledge domains is both a time consuming manual job and a computationally complex process.

It needs to be observed that a number of the known systems even miss the power to account of the relational nature of knowledge. Further knowledge doesn't consist of bare lists of concepts but knowledge is generally considered to be a network of explicitly related concepts.

SUMMARY OF INVENTION

It is an object of the present invention to provide an improved method, system, and computer program product for processing ensembles of digital data in order to disclose the structure of the information available in these data ensembles.

This object is obtained by the present invention, in a computer controlled method for automatically segmenting an ensemble of digital data comprising a step of acquiring the ensemble of data, and wherein this ensemble of data is segmented by:

identifying a first subset of sequences of Linking Data Elements, based on a repository of Linking Data Elements, each sequence comprising at least one Linking Data Element, identifying a second subset of sequences of Information Carrying Data Elements, each sequence comprising at least one Information Carrying Data Element, the sequences of Information Carrying Data Elements being linked by the sequences of Linking Data Elements, and providing the subsets in a structured format.

The invention is based on the insight that any ensemble of data can be structured by linked Information Carrying Data Elements (ICDEs). By defining and identifying Linking Data Elements (LDEs) of an ensemble of data, it is possible to identify the ICDEs without predefining them for analysis purposes. In the domain of textual data, for example, the ICDEs are generally called concepts and the LDEs are generally called relations.

The approach of segmenting the ensembles of data using a repository of predefined LDEs and/or sequences of LDEs in accordance with the present invention, has the advantage that the ICDEs are discovered within the context of the ensemble. Once the ICDEs have been identified, the structure of the information in an ensemble of data becomes explorable.

Because LDEs are essentially context and domain independent, they appear in almost all imaginable ensembles of data in the same way. This provides the advantage that a relatively small set of LDEs allows to analyse, structure and interpret a complete set of all imaginable ensembles of data as to the information contained therein. That is, in the light of the present invention, the set of LDEs can be considered as the equivalent of a closed set in mathematics, whereas the ICDEs can be considered as the equivalent of an infinite set in mathematics.

Furthermore LDEs may comprise of a particular type such as geometrical, logical, spatial, temporal and psychological. Within a repository LDEs may be but don't need to be explicitly categorized as of a particular type.

The ICDEs may comprise of sequences of data elements or of patterns formed by different data elements.

In the context of the present invention, an ensemble of digital data is any gathering of computer readable data arranged in one or more files, in data blocks, or in any other format relating to any type of data such as a linguistic data, image data, video data, sound data, control data, measurement data, olfactive and tactile data.

In a further embodiment of the invention, subsequences of a sequence are identified as a being part of a sequence occurring in at least two different sequences. Like the sequences, subsequences may contribute to the analysis of the structure of the information provided in a data ensemble, and may comprise further meaningful information.

According to the present invention, the sequences and subsequences may be ranked based on their presence in an ensemble of data, providing a general ranking and the general ranking may be represented in a structured format for further use by humans, machines or devices. The general ranking may be specifically based on a ranking of position of sequences and subsequences in an ensemble of data, a ranking based on frequency of occurrence of sequences and subsequences in an ensemble of data, and a ranking based on length of sequences and subsequences.

According to a further embodiment of the invention, sequences may be ranked based on co-occurring subsequences, providing a subsequence based ranking and the subsequence based ranking may be represented in a structured format for further use by humans, machines or devices.

Yet further, in accordance with the invention, the sequences and subsequences may be ranked based on being linked with any other sequences and subsequences by an LDE providing a linkage ranking. The linkage ranking may be represented in a structured format for further use by humans, machines or devices.

In a data ensemble, any of the sequences and subsequences and LDEs may have an order of occurrence and any of the sequences and subsequences may be ranked in accordance with the invention based on the order of occurrence with a particular LDE, providing an order based ranking and representing the order based ranking in a structured format.

The rankings disclosed above in accordance with the present invention are based on parts of the data ensemble carrying information rather than on a minimal data entity approach, known in the prior art, as for example rankings based on individual words or letters in text data or 16-bit samples in a PCM sound file, or pixels in a video file. Any of these rankings may be advantageously used, in accordance with the invention, for determining clusterability of a sequence or a subsequence.

On the basis of the clusterability, datasets of the ensemble of data may be selected, representing information carrying parts and linked parts associated with a particular sequence, or subsequence. This to enhance the analysis of the structure of the information contained in a data ensemble, thereby enhancing the speed and efficiency in browsing or stepping through the data, the efficiency of disclosing the information in the data, the efficiency of searching for particular information parts or informative subsets of the data and the efficiency of representing the data to human users or machines. Further, the data ensemble may be structured on the basis of the sequences and subsequences.

By structuring data ensembles based on sequences and subsequences in accordance with the invention, superfluous storage of non-informational minimal data entities is effectively prevented. Moreover a compression of the ensembles of data can be achieved because the rankings of (sequences of) ICDEs and LDEs together with their positions of occurrence in the ensembles of data allow to build a lossless index of the ensemble of data based on which the original ensembles of data can be reconstructed without having to store them.

In a further embodiment of the invention density and sparsity of an ensemble of data may be determined based on the clusterability and linkage data ranking.

For enhancing and completing the repository of LDEs the invention further provides that two or more LDEs may be combined based on an order of occurrence of the LDEs in the ensemble of data.

For data interpretation the LDEs may be associated with a predefined qualification in a qualification system and a sequence or subsequence may be qualified according to its order of occurrence with a particular LDE and in accordance with the qualification of the linking data. This qualification may be presented in a structured format for further use.

Qualifications may be any of a group of sentiment or mood based indications, judgements on a positive/negative scale, numerical denotations, etc.

In accordance with the invention a sequence may be further qualified based on the qualification of subsequences of that sequence.

In the event that any of the sequences, subsequences and LDEs have a predefined qualification in a qualification system, the qualification of any of a sequence, subsequence and LDE may be adapted according to its order of occurrence with any of a particular LDE, a particular sequence, and a particular subsequence and in accordance with the qualification of the LDE. The adapted qualification may be represented in a structured format for further use.

The invention further provides that the predefined qualifications of an LDE is comprised in the repository. Qualifications can however also be retrieved from remote sources of information such as for example sentiment and mood based dictionaries.

For further interpretation and exploitation of an ensemble of data, in accordance with the invention, any of the sequences, subsequences and LDEs may have a predefined semantic denotation, and wherein any of a sequence, subsequence and LDE is semantically denoted according to its order of occurrence with any of a particular LDE, a particular sequence, and a particular subsequence and in accordance with the semantic denotation of any of the LDE, the sequences and subsequences. This denotation is represented in a structured format.

Further in accordance with the invention any of a sequence and subsequence may be identified as a semantic denotation for any of an other sequence and subsequence based on being linked with any other sequence and subsequence by a specific LDE.

Semantic denotations of any of a sequence, a subsequence and an LDE may be stored in the repository.

The data ensemble may be structured based on the semantic denotation of any of the sequences and subsequences.

In another embodiment of the invention entities such as people, places, companies, chemical substances, diseases and many more are extracted from an ensemble of data by qualifying a sequence of ICDEs as being of a particular kind based on its occurrence in the ensemble of data in association with a specific subset of sequences of LDEs.

It has been found that sequences of LDEs have to be considered in some contexts as sequences of ICDEs. In accordance with another embodiment of the invention, after segmentation of an ensemble of data, the first subset of sequences of LDEs is assessed in order to determine whether sequences of this first subset have to be interpreted as pertaining to the second subset of ICDEs. This assessment may be performed on the basis of sequences being linked with a particular set of other sequences.

The information structure of the ensemble of data can be further uncovered, in accordance with the invention, by the fact that a specific semantic link or functional link between sequences of ICDEs is determined by the fact of being linked by at least one sequence of a specific set of sequences of LDEs.

For fully disclosing the information structure of the ensemble of data in accordance with the present invention semantic equivalent sequences of ICDEs and equivalent sequences of LDEs have to be determined. To this end, in a further embodiment of the invention, a plurality of sequences of ICDEs can be determined as semantically equivalent when this plurality of sequences is co-occurring in an ensemble of data and is linked by a specific set of sequences of LDEs with different sequences of ICDEs. A plurality of sequences of LDEs can be determined as semantically equivalent, in accordance with the present invention, when this plurality of sequences is co-occurring in an ensemble of data and is linking more than once different identical pairs of sequences of ICDEs.

In accordance with the invention actions may be initiated based on any of a qualification and a semantic denotation of any of a sequence and subsequence. This allows an event triggered information representation. For example having established from the data ensemble the occurrence of a heart fibrillation may trigger a representation of datasets of an electronic patient record system meaningful to this heart fibrillation.

In general actions may comprise

Retrieval of data from an ensemble of data
Modification of an ensemble of data
Transferring data of an ensemble of data
Controlling at least one device
Interpreting data from an ensemble of data
Representation of an ensemble of data
Data compression of an ensemble of data.

In a particular advantageous embodiment of the method according to the invention an ensemble of data can be searched by segmenting the data and presenting in a structured format any of a sequence, a subsequence and an LDE according to any of the general ranking, the linkage ranking, the order based ranking, and the clusterability and further selecting any of a sequence, a subsequence and an LDE, and retrieving datasets of the ensemble of data in accordance with this selection.

The invention further provides a computer controlled system for automatically segmenting an ensemble of data comprising means for acquiring the ensemble of digital data and means for segmentation of the data arranged for identifying a first subset of LDEs based on a repository of LDEs and for identifying a second subset of sequences of ICDEs wherein the sequences are linked by the LDEs, and means for providing the subsets in a structured format.

The invention also provides a computer program product comprising a computer program arranged for performing the method disclosed above, if loaded into a memory of an electronic processing device. Such a computer program product may comprise any of a group of data carrying devices including floppy discs, CD-roms, DVDs, tapes, memory stick devices, zip drives, flash memory cards, remote access devices, hard disks, semi-conductor memory devices, programmable semi-conductor memory devices, optical disks, magneto-optical data storage devices, and ferro electric data storage devices.

BRIEF DESCRIPTION OF DRAWINGS

FIG. 1 schematically shows an ensemble of data comprising data elements referred to as a-m.

FIG. 5 represents a part of a repository of Linking Data Elements which are in a textual domain referred to as relations.

FIG. 9 represents a ranking based on frequency of occurrence of Information Carrying Data Elements which are in a textual domain referred to as concepts.

FIG. 10 schematically shows a ranking of sequences and subsequences based on the presence of common subsequences.

FIG. 14 represents the qualification negative of the sequence "division" as defined by the sentiment and mood based dictionaries.

FIG. 15 represents the sequences of Information Carrying Data Elements containing the subsequence "division". As an example the sequence "animal health division" results to be a qualified as neutral although the single subsequence division in a repository could be qualified as negative.

FIG. 17 shows an example of a subset of sequences of Information Carrying Data Elements that are associated with a specific semantic link (etiology) based on the fact of being linked by at least one sequence of a specific set of sequences of Linking Data Elements.

DETAILED DESCRIPTION OF EMBODIMENTS

For illustrative purposes and not limiting the scope of the invention, in the figures the invention will now be explained on the basis of examples from ensembles of textual or linguistic data. Those skilled in the art will appreciate that the invention can also be applied to any other data including: image data, video data, sound data, control data, measurement data, olfactive data and tactile data.

FIG. 1 shows an ensemble of digital data comprising data elements a-m, which can take the form of e.g. samples, bytes, strings according to the nature of the digital data ensemble. In the case of text data the data elements a-m are representing words grouped as sentences C1-CR4.

Figure 2:
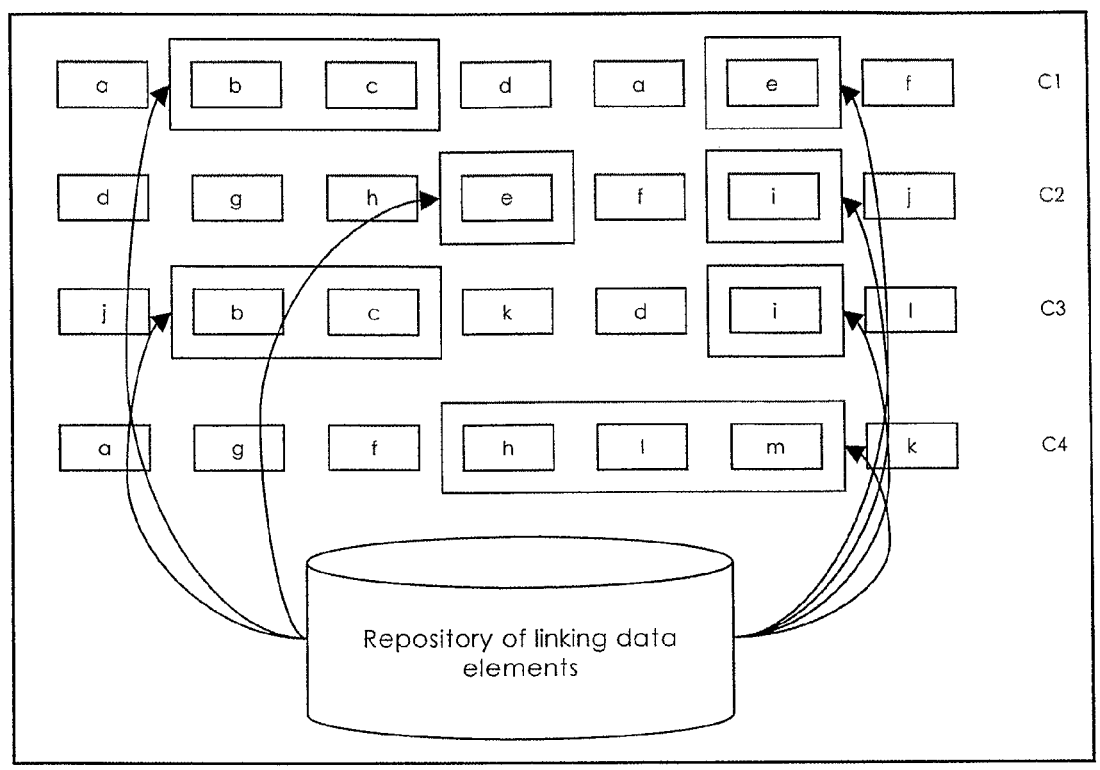
FIGS. 2-3 schematically show the segmentation process in accordance with the invention.

FIG. 2 shows the data segmenting process wherein the data elements are segmented into sequences of Linking Data Elements (LDEs) available in a repository. The identified LDEs are indicated in rectangular frames. A sequence comprises at least LDE.

Figure 3:
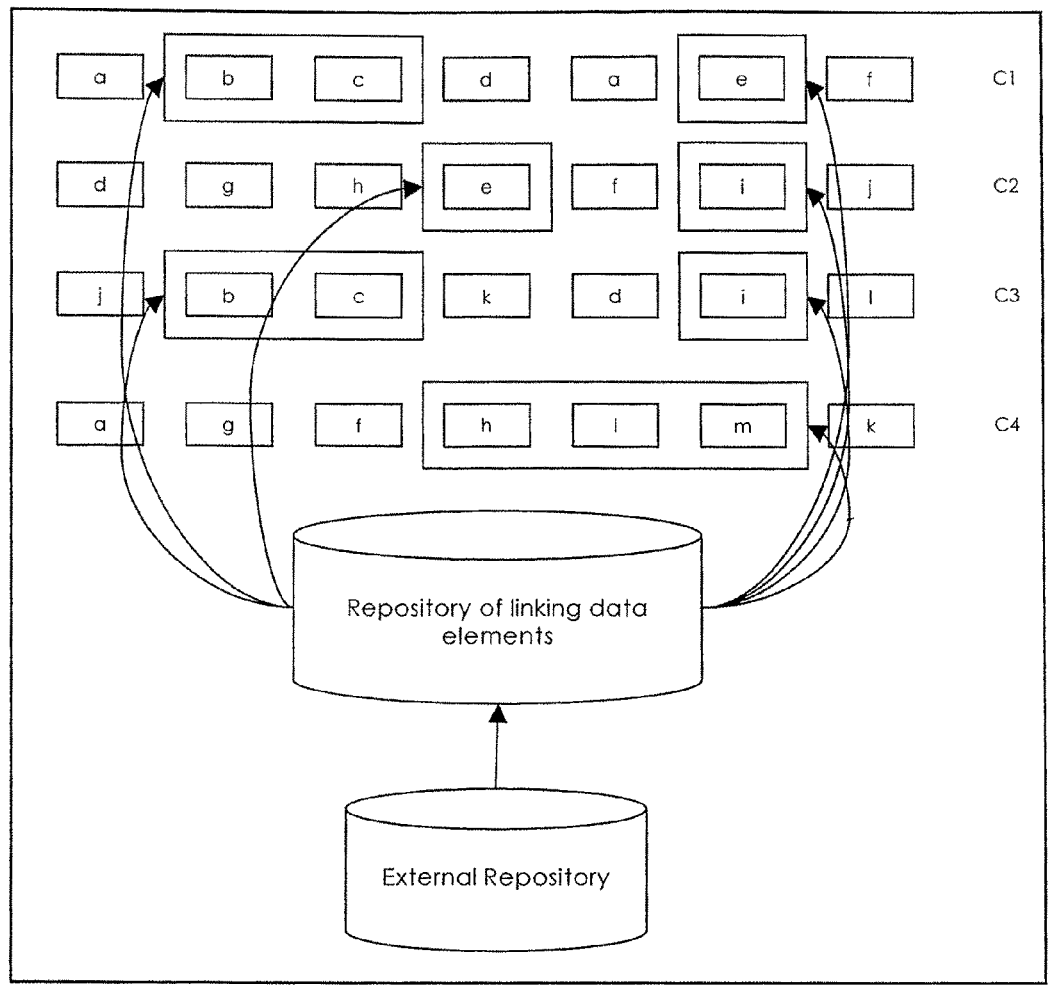

As shown in FIG. 3, LDEs may be retrieved from an external or remote repository, through suitable data communication means.

Figure 4:
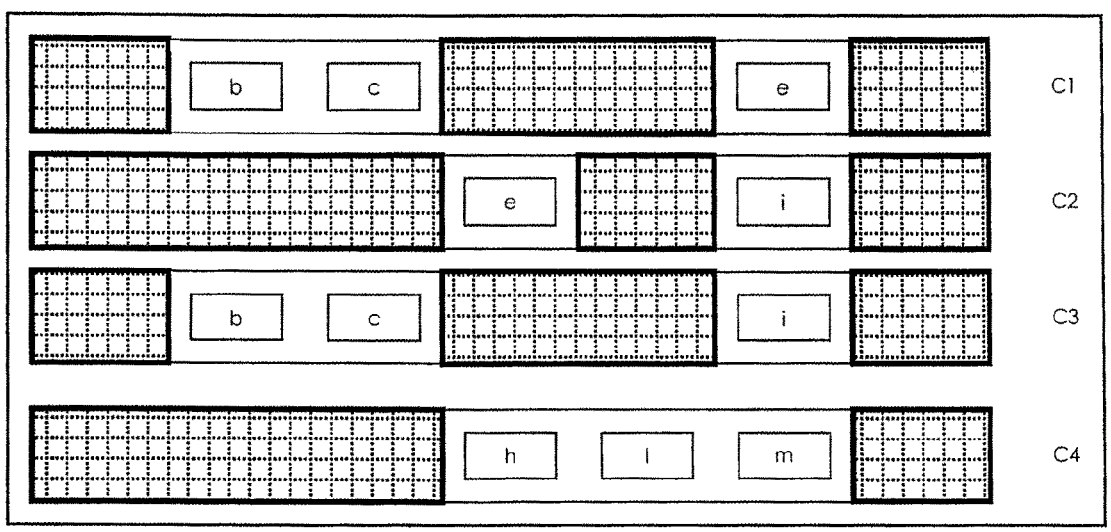
FIG. 4 schematically shows the segmented ensemble of data in accordance with the invention.

In accordance with the invention as shown in FIG. 4, the sequences of data elements not identified as LDEs are considered as sequences of Information Carrying Data Elements (ICDEs) which sequences of ICDEs are shown in the bold and dashed boxes. A sequence of ICDEs contains at least one ICDE.

FIG. 5 represents a part of a repository of LDEs which are in a textual domain referred to as relations. These elements are semantically denoted but this is not necessary for performing data analysis. Sequences of LDEs can be classified into different types as for example: concept splitters, pause markers, modifiers or states and meaningful relations. Moreover the sequences of LDEs can be of N-ary type, wherein N=2, 3, 4, . . . e.g. binary sequences of LDEs link two sequences of ICDEs and tertiary sequences of LDEs link three sequences of ICDEs.

Figure 6:
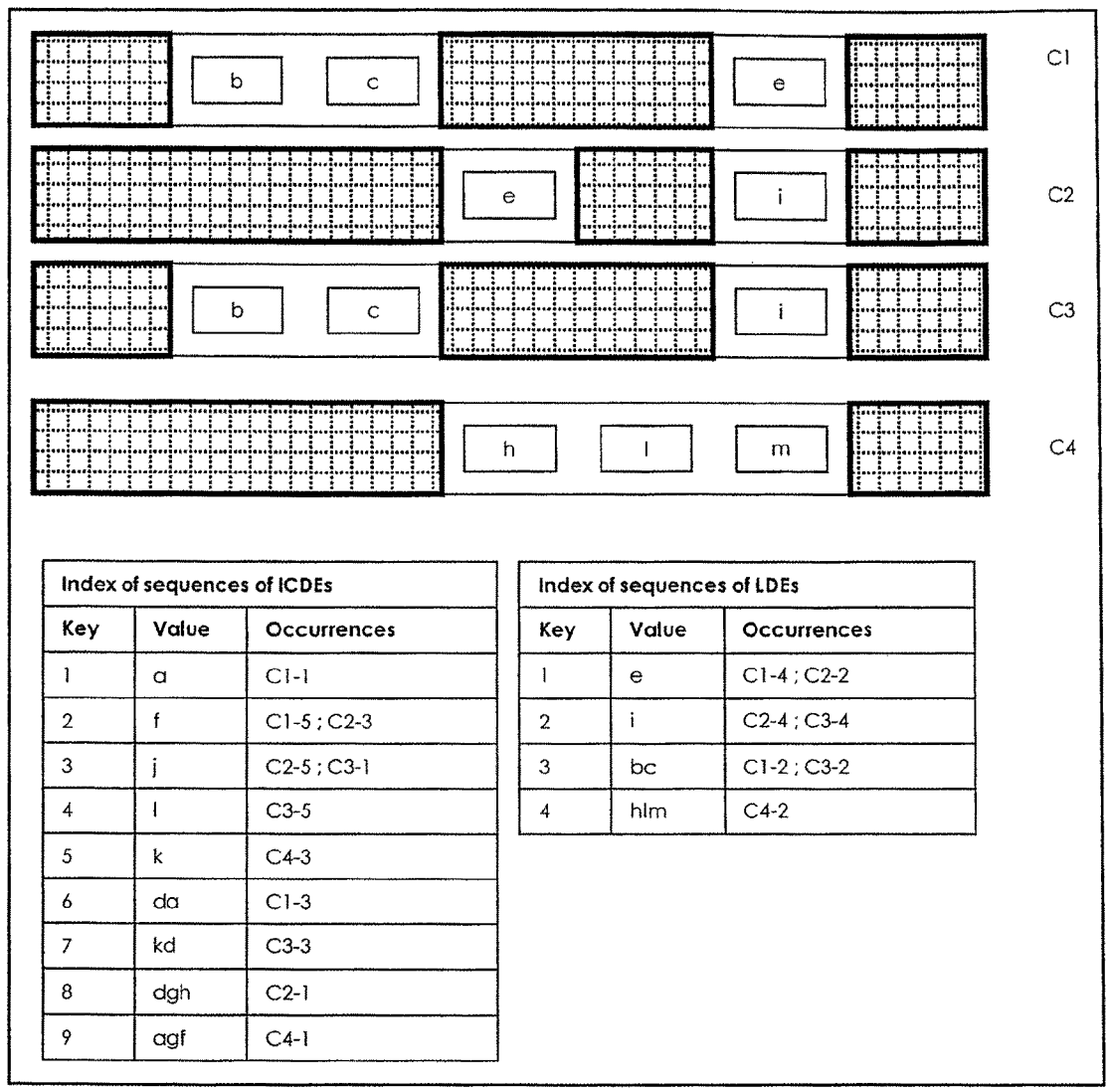
FIG. 6-8 schematically show several rankings of sequences in accordance with the present invention.

FIG. 6 schematically shows a ranking of sequences of ICDEs and LDEs based on their length.

Figure 7:
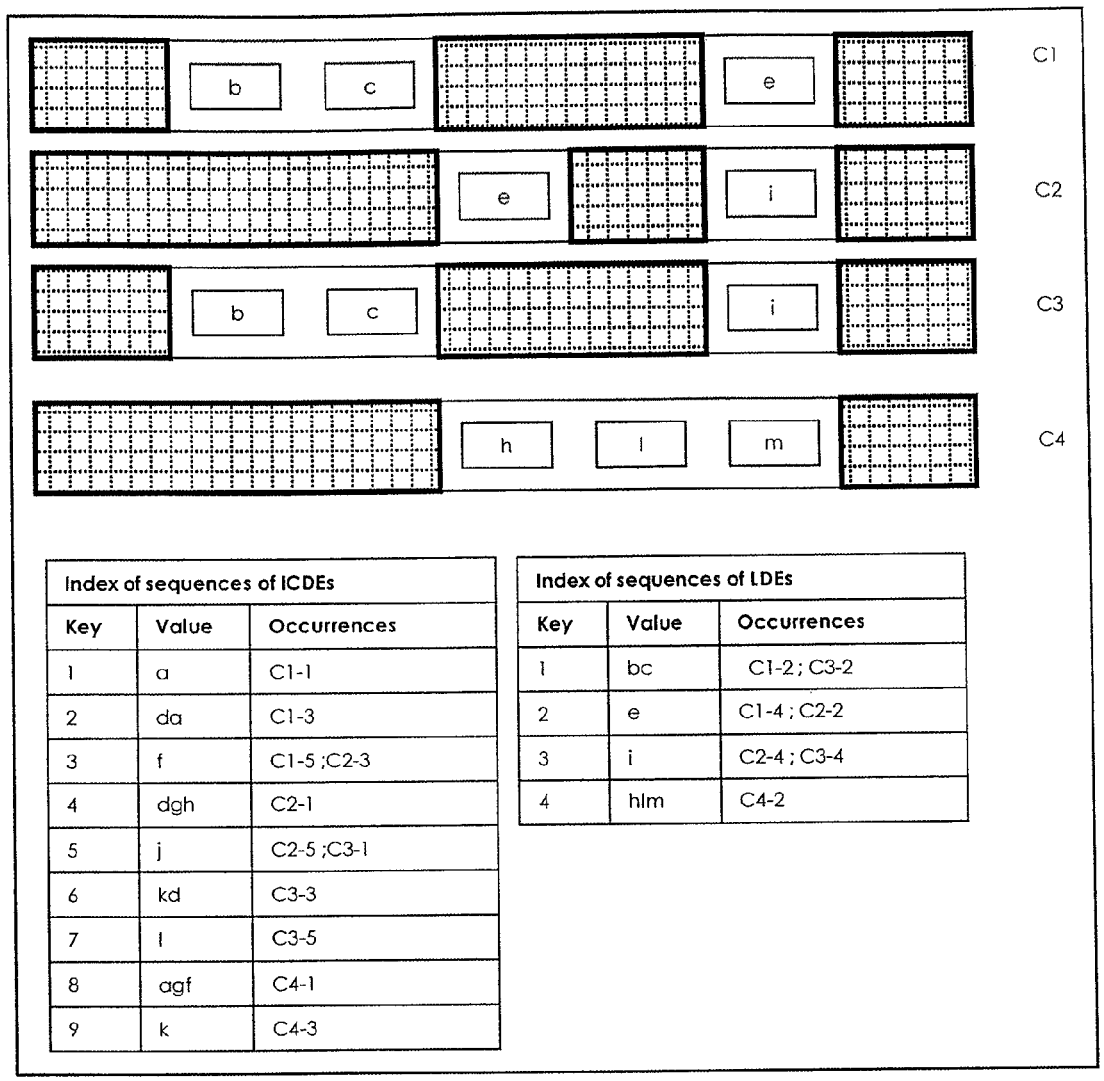

FIG. 7 schematically shows a ranking of sequences of ICDEs and LDEs based on their order of occurrence in the ensemble of digital data.

Figure 8:
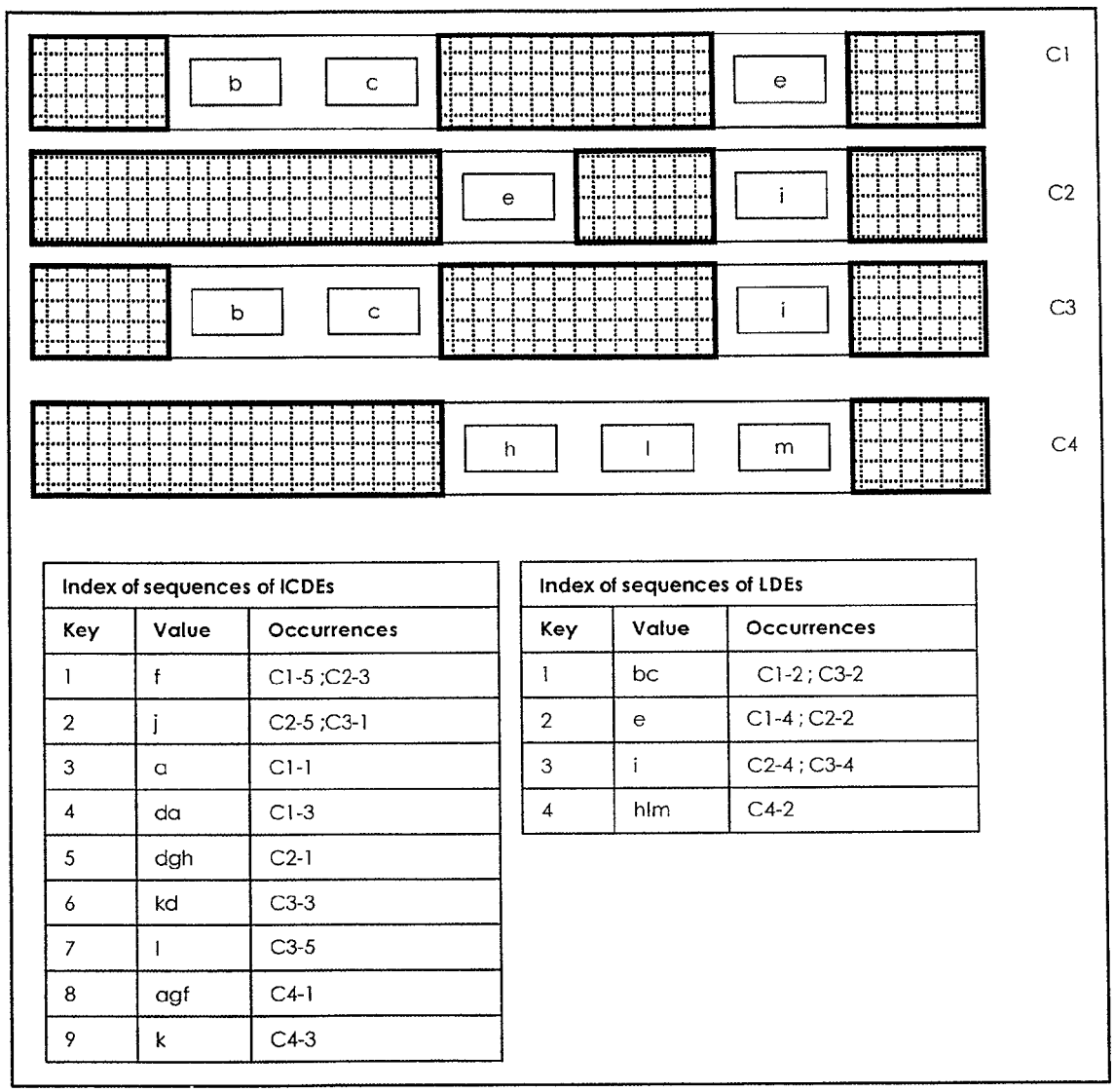

FIG. 8 schematically shows a ranking of sequences of ICDEs and LDEs based on their frequency of occurrence in the ensemble of digital data.

In FIGS. 6-8 and in FIG. 10, key can be considered as the numerical key values used in classical database systems to indicate a data address. The value refers to the actual content of the data address, in this case, each time a sequence is identified.

FIG. 9 schematically represents a ranking on order of frequency of Information Carrying Data Elements which are in a textual domain referred to concepts.

FIG. 10 schematically represents a ranking based on co-occurrence of subsequences.

Figure 11:
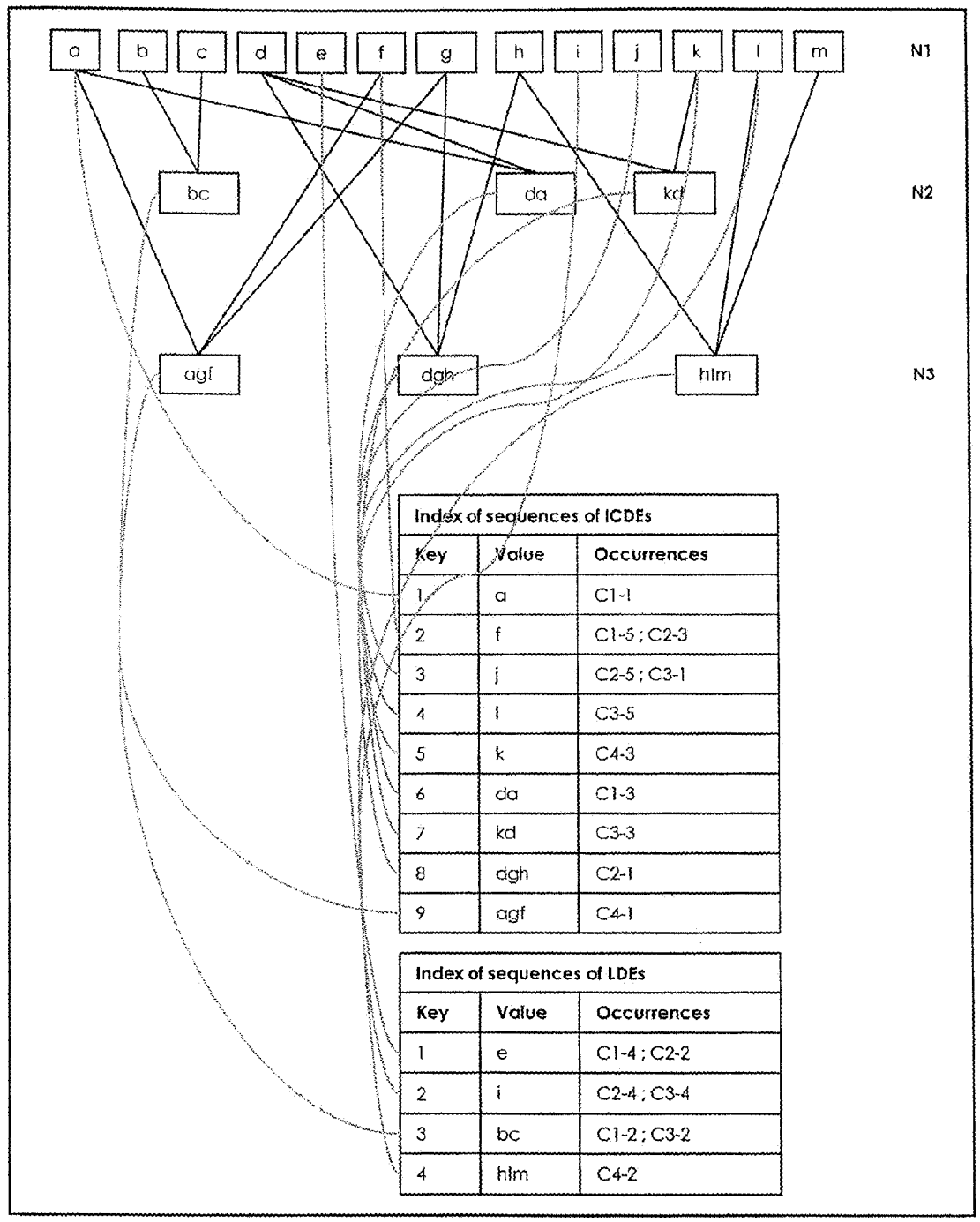
FIG. 11-13 schematically show how sequences and subsequences can be used to build lossless indices representing the original ensemble of data searchable in constant time and with minimal redundancy.
Figure 12:
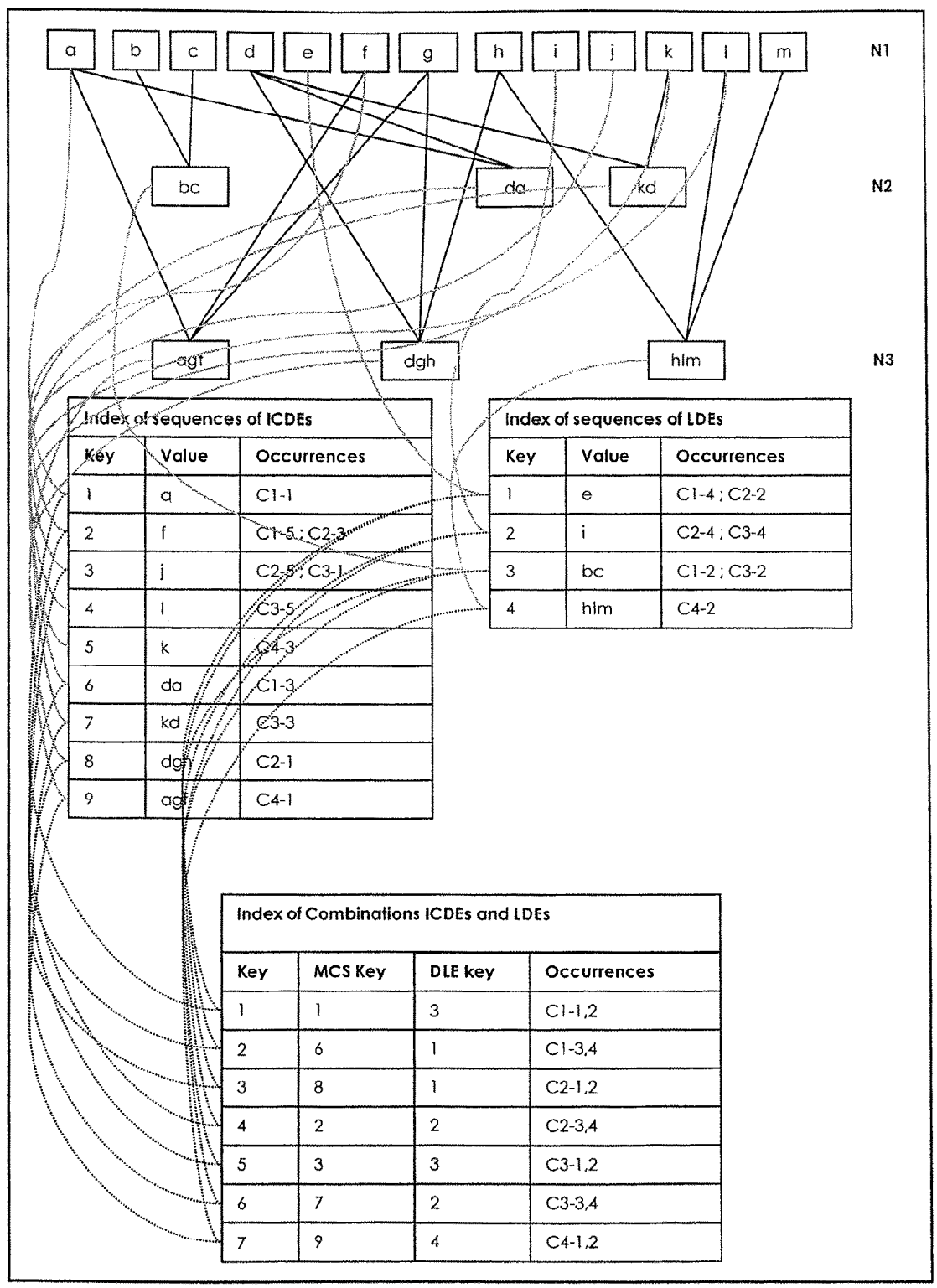
Figure 13:
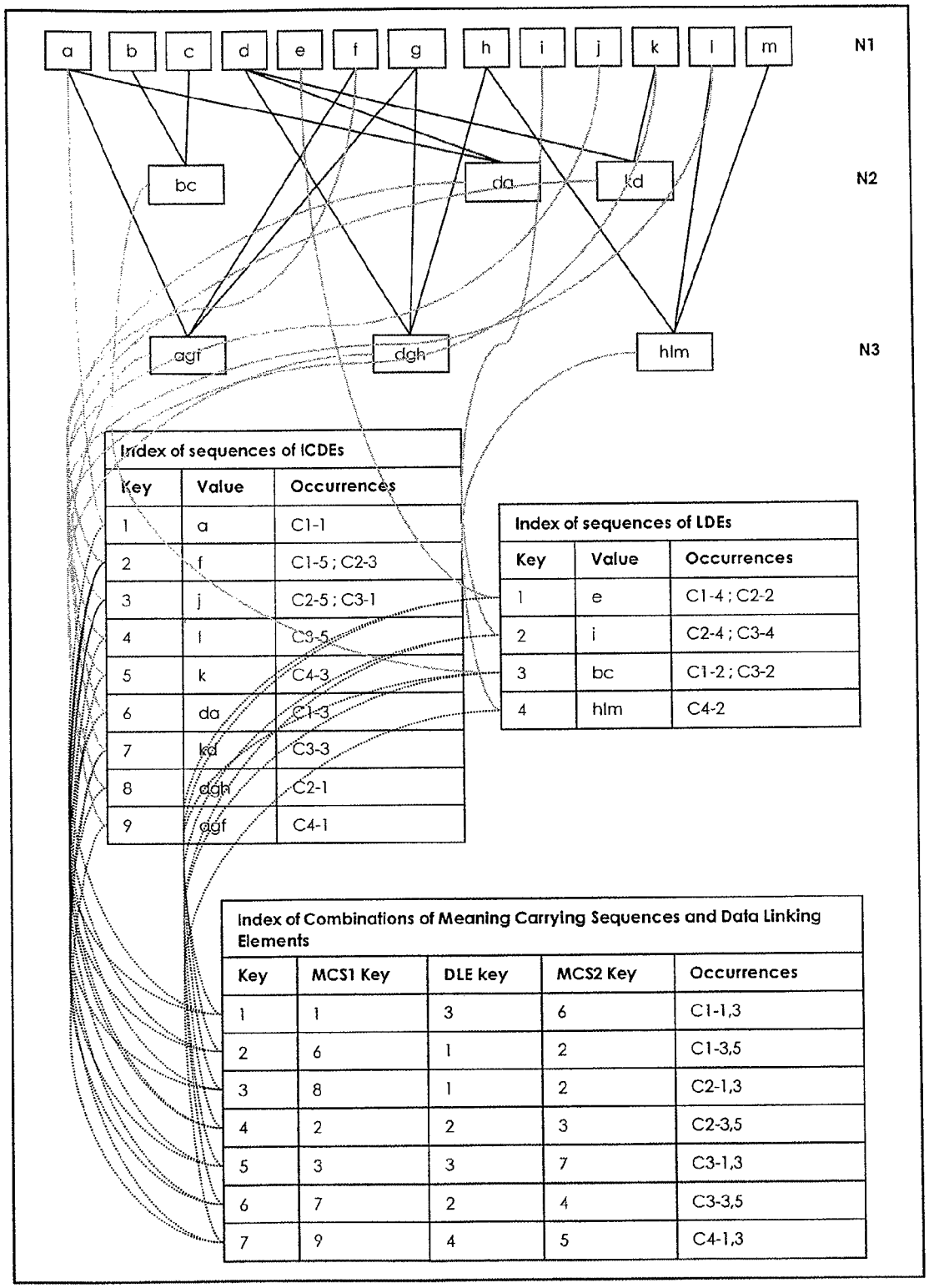

FIG. 11-13 schematically show how sequences and subsequences can be used to build lossless indices representing the original ensemble of data searchable in constant time and with minimal redundancy. Moreover the principle of clusterability is illustrated by the fact that in FIG. 12 an additional index of combinations of sequences of ICDEs and LDEs is built based on their neighbourhood in the ensemble of digital data. In FIG. 13 the additional index contains patterns of sequences of two ICDEs linked by a sequence of LDEs.

FIG. 14 represents the qualification negative of the sequence "division" as defined by the sentiment and mood based dictionaries.

FIG. 15 represents the sequences of Information Carrying Data Elements containing the subsequence "division". As an example the sequence "animal health division" results to be a qualified as neutral although the single subsequence division in a repository could be qualified as negative.

Figure 16:
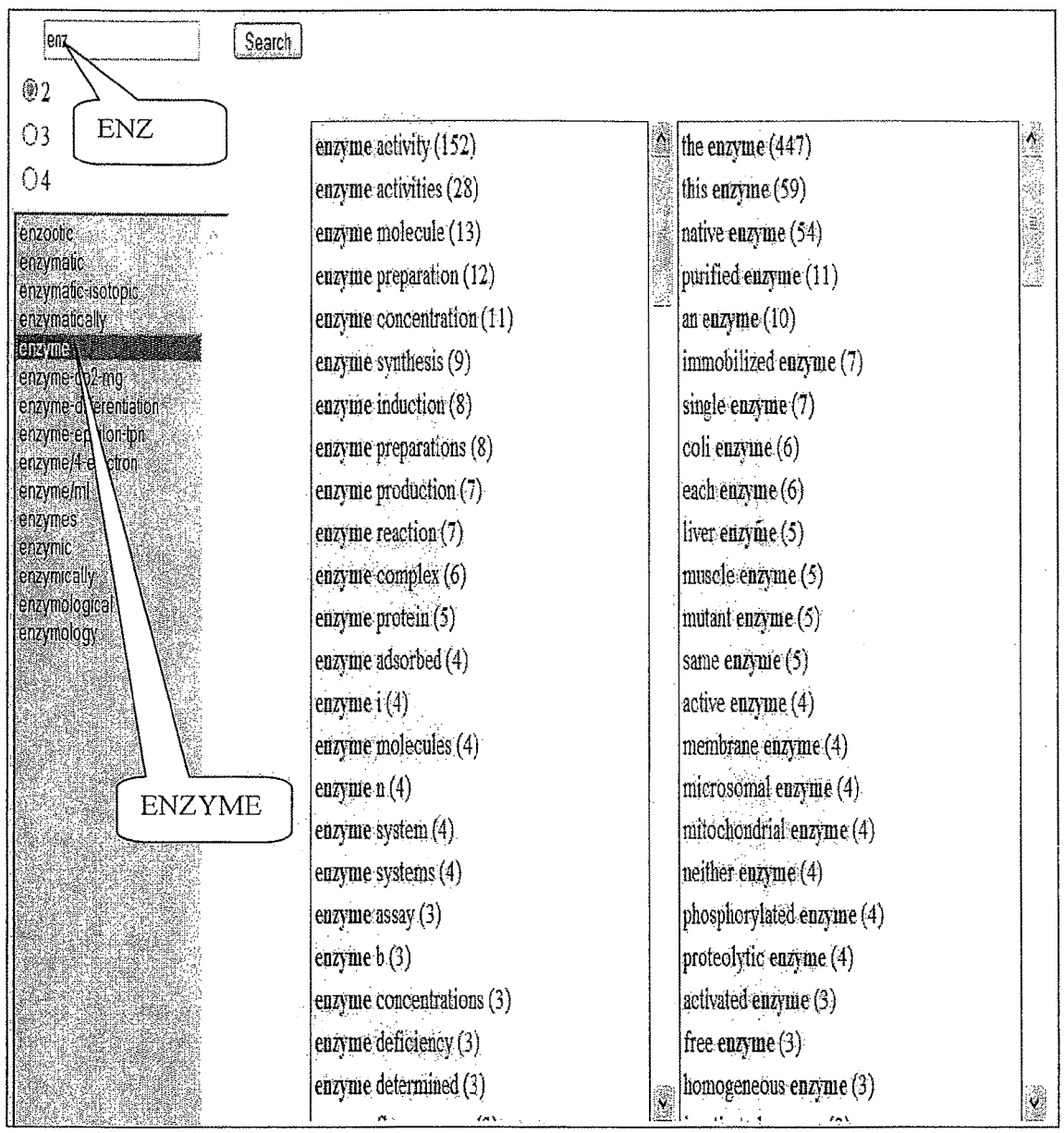
FIG. 16 represents the search within a ensemble of data from the subsequence "enz", where this subsequence is represented in the first and second position of a bigram data sequence.

FIG. 16 represents the search within a ensemble of data from the subsequence "enz", where this subsequence is represented in the first and second position of a bigram (this means consisting of 2 words) data sequence. This search is also applicable to Ngram-data sequences (N=3, 4, 5, . . . ).

FIG. 17 shows an example of a subset of sequences of Information Carrying Data Elements that are associated with a specific semantic link (etiology) based on the fact of being linked by at least one sequence of a specific set of sequences of Linking Data Elements.

The invention also provides a computer program product comprising a computer program arranged for performing the method disclosed above, if loaded into a memory of an electronic processing device. Such a computer program product may comprise any of a group of data carrying devices including floppy discs, CD-roms, DVDs, tapes, memory stick devices, zip drives, flash memory cards, remote access devices, hard disks, semi-conductor memory devices, programmable semi-conductor memory devices, optical disks, magneto-optical data storage devices, and ferro electric data storage devices.

The invention has been disclosed herein with reference to several examples of text information sources. Those skilled in the art will appreciate that the invention is not limited to such information sources. Other examples and embodiments of the invention will be apparent to persons skilled in the art by reading and consideration of the present specification.

What is claimed is:

1. A computer controlled method for analyzing unstructured data, wherein said unstructured data comprises a plurality of data elements, and wherein the unstructured data is at least one of text data, linguistic data, image data, video data, sound data, control data, measurement data, olfactive data and tactile data, the method comprising acts of:
   identifying a first subset of the plurality of data elements as Linking Data Elements (LDEs), wherein each of the LDEs is at least one of text data, linguistic data, image data, video data, sound data, control data, measurement data, olfactive data and tactile data, wherein identifying a first subset comprises:
      retrieving, from a repository, a predetermined set of stored LDEs; and
      comparing the unstructured data to the predetermined set of stored LDEs;
   identifying a second subset of the plurality of data elements as Information Carrying Data Elements (ICDEs), wherein the second subset is comprised of every data element not identified as an LDE; and
   representing the unstructured data in a structured format based on the identification of LDEs and ICDEs.

2. The computer controlled method of claim 1, further comprising acts of:
   identifying a plurality of LDE sequences within the first subset, each LDE sequence of the plurality of LDE sequences comprising at least one LDE; and
   identifying a plurality of ICDE sequences within the second subset, each ICDE sequence of the plurality of ICDE sequences comprising at least one ICDE.

3. The computer controlled method of claim 2, wherein the act of representing the unstructured data comprises:
   ranking the plurality of IDE sequences and/or the plurality of ICDE sequences based on a property of each of the sequences; and
   representing the unstructured data in a structured format based on the act of ranking.

4. The computer controlled method of claim 3, wherein the property comprises at least one of:
   a length associated with each of the sequences;
   an order of occurrence of each of the sequences in the unstructured data;
   a frequency of occurrence of each of the sequences in the unstructured data; and
   one or more links to other sequences.

5. The computer controlled method of claim 2, further comprising acts of:
   identifying one or more subsequences within the plurality of LDE sequences and/or the plurality of ICDE sequences, wherein the one or more subsequences occur in at least two different sequences of the plurality of LDE sequences and/or the plurality of ICDE sequences.

6. The computer controlled method of claim 5, wherein the act of representing the unstructured data comprises:
   ranking the plurality of LDE sequences and/or the plurality of ICDE sequences based on a property of the one or more subsequences; and
   representing the unstructured data in a structured format based on the act of ranking.

7. The computer controlled method of claim 6, wherein the property comprises at least one of:
   a length associated with the one or more subsequences;
   an order of occurrence of the one or more subsequences in the unstructured data;
   a frequency of occurrence of the one or more subsequences in the unstructured data; and
   one or more links to other subsequences.

8. The computer controlled method of claim 5, wherein the act of representing the unstructured data comprises:
   ranking the plurality of LDE sequences and/or the plurality of ICDE sequences based on co-occurring subsequences; and
   representing the unstructured data in a structured format based on the act of ranking.

9. The computer controlled method of claim 1, further comprising acts of:

retrieving, from the repository, predefined information associated with at least one LDE of the predetermined set of stored LDEs and;

ranking the LDE sequences in the first subset based on the predefined information; and wherein the act of representing comprises representing the unstructured data in a structured format based on the act of ranking.

10. The computer controlled method of claim 9, wherein the predefined information comprises a semantic denotation of the at least one LDE.

11. The computer controlled method of claim 9, wherein the predefined information comprises a qualification in a qualification system of the at least one LDE.

12. The computer controlled method of claim 11, wherein the qualification comprises at least one of: an indication of mood, an indication of judgment on a positive/negative scale, and a number.

13. A computer controlled method for analyzing unstructured data, wherein said unstructured data comprises a plurality of data elements, the method comprising acts of:

retrieving a plurality of Linking Data Elements (LDEs) from a repository, wherein each of the plurality of LDEs is at least one of text data, linguistic data, image data, video data, sound data, control data, measurement data, olfactive data and tactile data;

segmenting the unstructured data into a first subset of sequences of LDEs included within the plurality of LDEs, each sequence of said first subset of sequences comprising at least one LDE;

identifying, in the unstructured data, a second subset of sequences of Information Carrying Data Elements (ICDEs) not included within said first subset of sequences of LDEs, each sequence of said second subset of sequences being linked by a sequence of said first subset of sequences and comprising at least one ICDE, wherein every data element of the unstructured data not identified as an LDE is identified as an ICDE; and representing combinations of LDEs of the first subset and ICDEs of the second subset in a structured format based on occurrence thereof in the unstructured data;

wherein the unstructured data is at least one of text data, linguistic data, image data, video data, sound data, control data, measurement data, olfactive data and tactile data.

14. A computer controlled method for analyzing unstructured data, wherein said unstructured data consists essentially of a plurality of Linking Data Elements (LDEs) and a plurality of Information Carrying Data Elements (ICDEs), and wherein the unstructured data is at least one of text data, linguistic data, image data, video data, sound data, control data, measurement data, olfactive data and tactile data, the method comprising acts of:

identifying the plurality of LDEs of the unstructured data, wherein each of the LDEs is at least one of text data, linguistic data, image data, video data, sound data, control data, measurement data, olfactive data and tactile data, wherein identifying the plurality of LDEs comprises:

retrieving, from a repository, a predetermined set of stored LDEs; and comparing the unstructured data to the predetermined set of stored LDEs;

identifying every portion of the unstructured data not previously identified as an LDE as one of the plurality of ICDEs; and representing the unstructured data in a structured format based on the identification of LDEs and ICDEs.

* * * * *